United States Patent
Wu et al.

(10) Patent No.: US 11,038,891 B2
(45) Date of Patent: Jun. 15, 2021

(54) DECENTRALIZED IDENTITY MANAGEMENT SYSTEM

(71) Applicant: EMC IP Holding Company LLC, Hopkinton, MA (US)

(72) Inventors: Pengfei Wu, Shanghai (CN); Stephen J. Todd, Center Conway, NH (US); Kun Wang, Beijing (CN)

(73) Assignee: EMC IP Holding Company LLC, Hopkinton, MA (US)

( * ) Notice: Subject to any disclaimer, the term of this patent is extended or adjusted under 35 U.S.C. 154(b) by 208 days.

(21) Appl. No.: 16/173,446

(22) Filed: Oct. 29, 2018

(65) Prior Publication Data

US 2020/0137064 A1    Apr. 30, 2020

(51) Int. Cl.
*H04L 9/06* (2006.01)
*H04L 9/00* (2006.01)
*H04L 29/06* (2006.01)
*G06F 16/182* (2019.01)

(52) U.S. Cl.
CPC .......... *H04L 63/102* (2013.01); *G06F 16/182* (2019.01); *H04L 9/006* (2013.01); *H04L 9/0637* (2013.01); *H04L 63/0823* (2013.01); *H04L 2209/38* (2013.01)

(58) Field of Classification Search
CPC . H04L 63/102; H04L 63/0823; H04L 9/0637; H04L 9/3239; G06F 16/182
See application file for complete search history.

(56) References Cited

U.S. PATENT DOCUMENTS

2019/0036887 A1*  1/2019  Miller .................... G06Q 20/06
2019/0042867 A1*  2/2019  Chen ........................ H04W 4/70

OTHER PUBLICATIONS

U.S. Appl. No. 15/897,771 filed in the name of Stephen J. Todd et al. on Feb. 15, 2018 and entitled "Decentralized File System and Message Bus Architecture for Processing Training Sets in Multi-Cloud Computing Environment."
U.S. Appl. No. 15/959,386 filed in the name of Pengfei Wu et al. on Apr. 23, 2018 and entitled "Decentralized Data Protection System for Multi-Cloud Computing Environment."
U.S. Appl. No. 16/048,785 filed in the name of Pengfei Wu et al. on Jul. 30, 2018 and entitled "Decentralized Policy Publish and Query System for Multi-Cloud Computing Environment."

* cited by examiner

*Primary Examiner* — Farid Homayounmehr
*Assistant Examiner* — Suman Debnath
(74) *Attorney, Agent, or Firm* — Ryan, Mason & Lewis, LLP (57) ABSTRACT

A given node associated with a plurality of nodes registers a decentralized identity for the given node on a decentralized identity blockchain. The registered decentralized identity is controlled by the given node and defined by an identity record stored on the decentralized identity blockchain. The registered decentralized identity for the given node is used to access one or more resources of a given decentralized application.

21 Claims, 11 Drawing Sheets

DECENTRALIZED IDENTITY MANAGEMENT SYSTEM

FIELD

The field relates generally to information processing system and, more particularly, to decentralized identity management in such systems.

BACKGROUND

Identity management is a process of managing information about users on computing networks. The information typically includes information that authenticates the identity of a user to a computing network. In many scenarios, the identity of the user needs to be authenticated prior to a computing network giving the user access to one or more of data, a service, an application, or another computing resource controlled by the computing network.

Typically, identity management is achieved in a centralized manner meaning that every user in a given system environment typically has to communicate with the same central identity management authority. For example, each user that wishes to access some resource on a computing network must first prove his identity to a server controlled by a central authority. The central authority then either notifies the computing network that a given user is authenticated or provides the given user with an authentication token that the given user must provide to the computing network. In either case, every user must contact the central authority to obtain access to resources of any computing network. However, such centralized identity management presents many challenges.

SUMMARY

Illustrative embodiments of the invention provide decentralized identity management.

For example, in one illustrative embodiment, a method comprises the following steps. A given node associated with a plurality of nodes registers a decentralized identity for the given node on a decentralized identity blockchain. The registered decentralized identity is controlled by the given node and defined by an identity record stored on the decentralized identity blockchain. The registered decentralized identity for the given node is used to access one or more resources of a given decentralized application.

In one or more illustrative embodiments, the identity record comprises a human readable name of the given node, and a public key corresponding to a private key held by the given node. The private key is usable by the given node to prove that the given node controls the identity, while the public key stored in the identity is usable by at least a subset of the plurality of nodes to verify that the given node controls the identity. Further, the identity record comprises a decentralized file system address pointing to immutable data stored remote from the decentralized identity blockchain. The identity record further comprises a decentralized name space address pointing to mutable data stored remote from the decentralized identity blockchain.

In one or more illustrative embodiments, the registered decentralized identity for the given node is used to access the one or more resources of the given decentralized application by sending a request from the given node to the given decentralized application to enable the given decentralized application to authenticate the given node by accessing the decentralized identity blockchain to obtain certificate-related data associated with the given node. An indication of authentication is received at the given node from the given decentralized application wherein access to the one or more resources of the given decentralized application is based on the indication of authentication, e.g., granted or denied.

Advantageously, illustrative embodiments overcome drawbacks associated with a centralized identity approach by providing decentralized identity management functionality that enables, by way of example only, elimination of a single point of system failure (e.g., a central identity server), a single identity for multiple resources or applications, user ownership of identity, balance between security and flexibility, improved scalability, improved availability, and/or reduction in latency.

These and other features and advantages of the invention will become more readily apparent from the accompanying drawings and the following detailed description.

DETAILED DESCRIPTION

Illustrative embodiments will be described herein with reference to exemplary information processing systems and associated host devices, storage devices and other processing devices. It is to be appreciated, however, that embodiments are not restricted to use with the particular illustrative system and device configurations shown. Accordingly, the term "information processing system" as used herein is intended to be broadly construed, so as to encompass, for example, processing systems comprising cloud computing and storage systems, as well as other types of processing systems comprising various combinations of physical and virtual computing resources.

An information processing system may therefore comprise, for example, a cloud infrastructure hosting multiple tenants that share cloud computing resources. Such systems are considered examples of what are more generally referred to herein as cloud computing environments. Environments that implement multiple cloud platforms are referred to as multi-cloud computing environments. A multi-cloud computing environment employed by an enterprise may comprise two or more clouds (e.g., two or more private clouds, two or more public clouds, or a combination of one or more private clouds and one or more public clouds).

One or more cloud platforms that are part of this environment may be within the exclusive control and management of the enterprise, and therefore are considered "private clouds." On the other hand, the cloud computing environment can include one or more cloud platforms that can be used by multiple enterprises, and not necessarily controlled or managed by any of the multiple enterprises but rather are controlled and managed by one or more third-party cloud providers. Such cloud platforms are typically considered "public clouds." More typically, but not exclusively, enterprises may choose to host their data (as well as applications, workloads, services, etc.) on a combination of private and public clouds that form a multi-cloud computing environment.

One or more clouds may also be referred to as a "data center." Alternatively, a data center may be comprised of one or more clouds. The term "enterprise" as used herein is intended to be broadly construed, and may comprise, for example, one or more businesses, one or more corporations or any other one or more entities, groups, or organizations. An "entity" as illustratively used herein may be a person or system.

As mentioned above, existing identity management is achieved in a centralized manner (identifiers management by a central authority). Illustrative embodiments realize that decentralized identity management using decentralized identifiers provides many advantages over centralized identifiers. With decentralized identifiers, the user can digitally identify himself/herself by holding a single private key. Moreover, only the user holding the private key, instead of one centralized server, owns the decentralized identifier.

Thus, as will be explained in detail herein, illustrative embodiments provide a decentralized identity management system. The system provides functionalities for the user and other entities to create, manage and use their own decentralized identifier. The proposed framework is also configured to interact with decentralized applications built on top of or otherwise in communication with this decentralized identity management system. One non-limiting example of a decentralized application that can be used with the decentralized identity management system is described in U.S. Ser. No. 16/048,785, filed on Jul. 30, 2018 and entitled "Decentralized Policy Publish and Query System for Multi-cloud Computing Environment," the disclosure of which is incorporated by reference herein in its entirety. Some examples will be described below using this decentralized policy publication and query application. However, it is to be appreciated that the decentralized identity management system is not be limited in any way to the application in the decentralized policy publication and query system described in U.S. Ser. No. 16/048,785. Prior to describing illustrative decentralized identity management embodiments, a brief illustrative explanation of centralized identity management will first be given.

Figure 1:
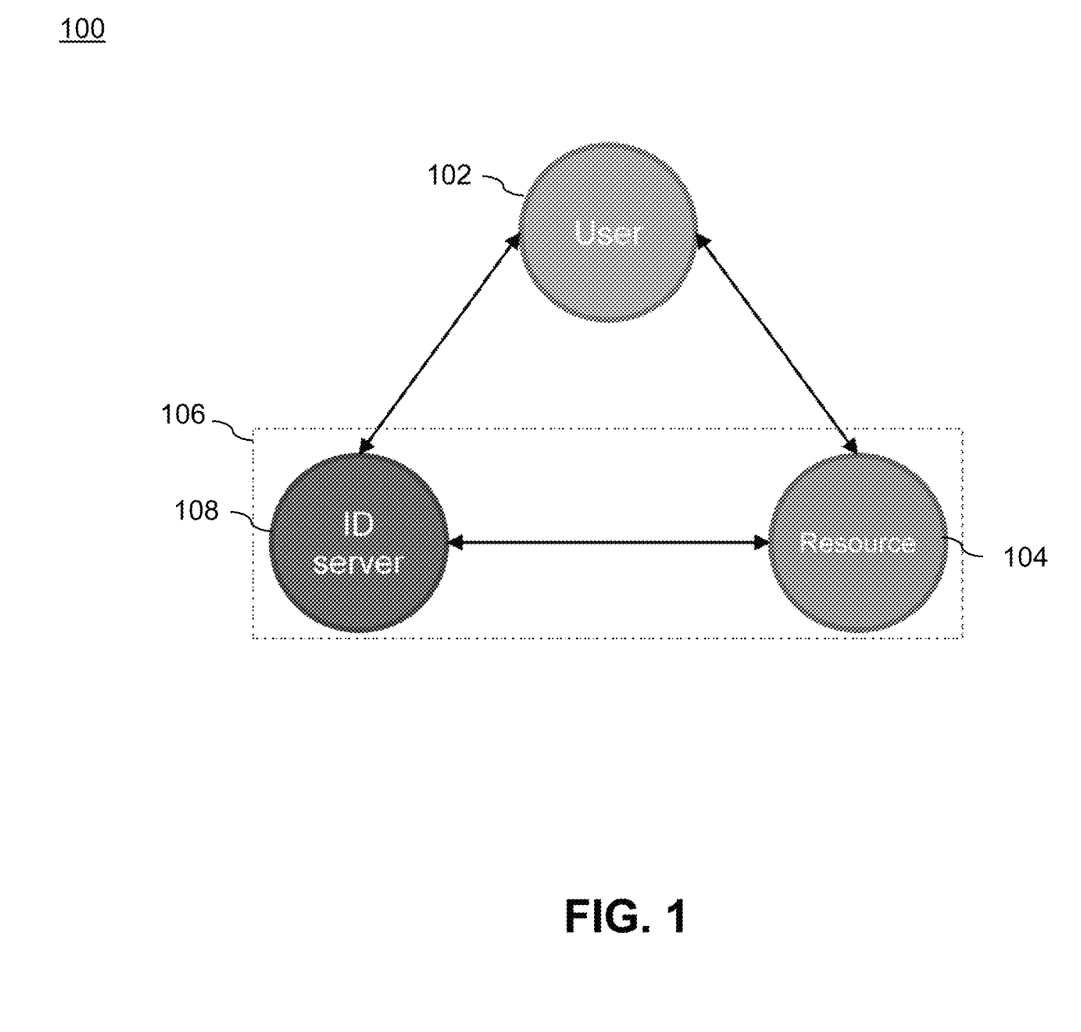
FIG. 1 illustrates participants in a centralized identity management process.

FIG. 1 illustrates participants in a centralized identity management process 100. As shown, a user 102 wants to request some resources 104 and authentication is required. The term "user" as used herein is understood to be an entity that interacts with the identity management system via a computer or other communication device (e.g., client device). "Resources," as mentioned above, can include data, services, applications, combinations thereof, or any other computer-accessible resource. Assume a centralized server 106 holds resources 104 and also holds identities of users in an identity (ID) server 108. The user 102 first contacts the ID server 108 to prove that he/she has the permission to retrieve the resources. However, the problem here is the user 102 does not own his/her identity. Instead, the centralized ID server 108 holds the identities. As such, it is possible that the identity is changed or even removed without notifying the user.

More recently, computing networks including ones that are public (e.g., Internet) and ones that are private (e.g., enterprise-controlled) have become more and more decentralized. For example, decentralized file systems and decentralized data protection systems have been proposed to manage and use data in a decentralized way. Nevertheless, in each of these decentralized resource solutions, the identity server is still centralized.

Figure 2:
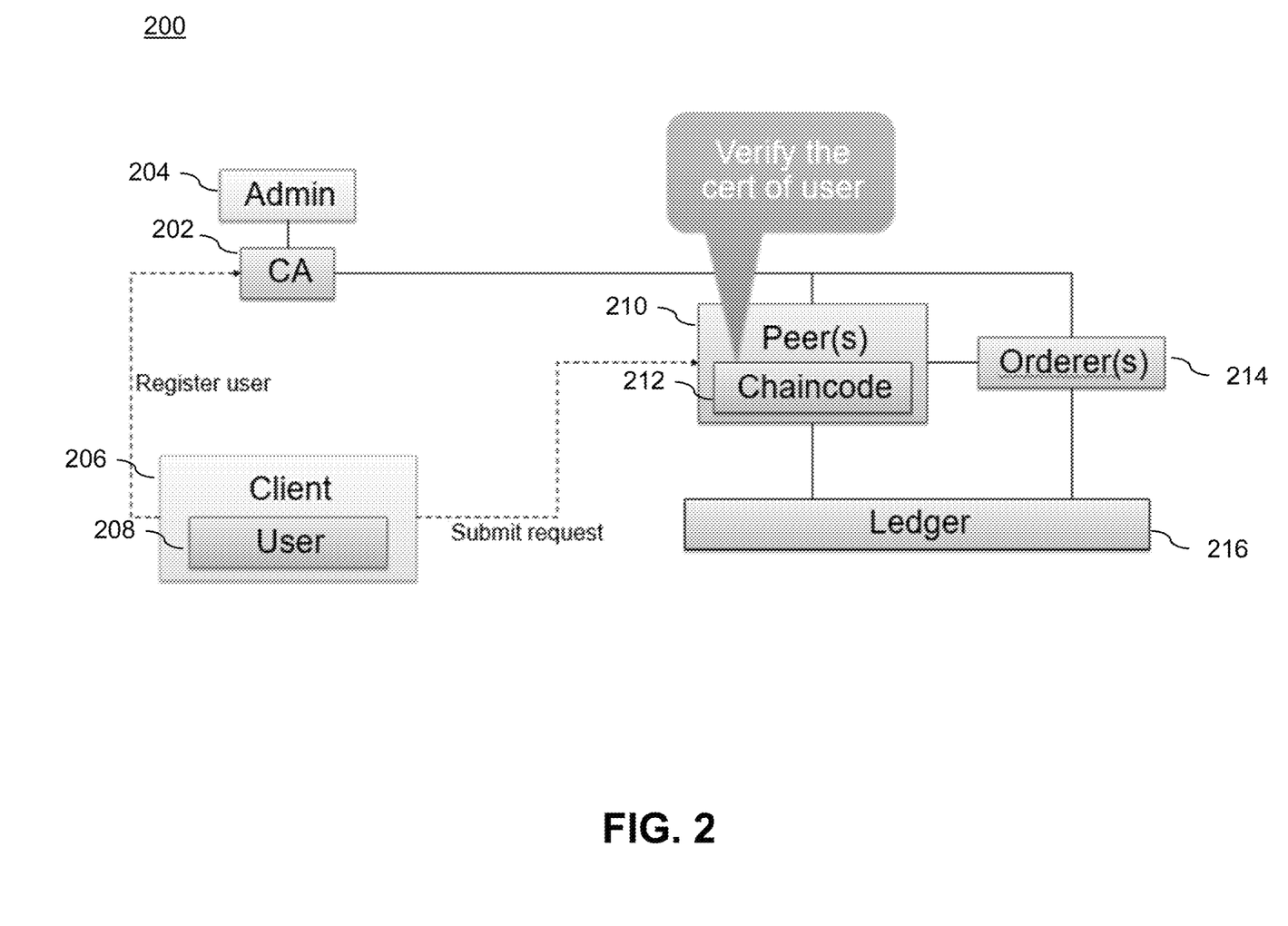
FIG. 2 illustrates an example of authentication in a centralized identity management process.

FIG. 2 illustrates an example of authentication in a centralized identity management process 200 in a policy file management system. More particularly, a central authority (CA) 202 provides a centralized identity management function. One or more administrators 204 oversee the CA operations. A client 206 associated with a given user 208 registers with CA 202. Note that client 206 can be any client in the system. Once registered in the identity management system, client 206 can submit a request to one or more peers 210 which process the request using chaincode 212 and orderer(s) 214 in conjunction with a ledger 216, e.g., a blockchain, as will be further described below.

In one implementation, the public key (of a public key/private key pair) of CA 202 is shared by all peers 210, so that every peer on the chain can verify a certificate provided by client 206 (in its request) independently. More particularly, user 208 requests access to ledger 216 from CA 202. CA 202 issues a certificate accordingly, where the certificate is digitally signed using the private key of CA 202. User 208 tries to access (read/write) ledger 216 by providing the certificate issued by CA 202. All peers 210 can verify the certificate independently and act accordingly. Note that orderer 214 (e.g., one orderer 214 per peer 210 in an illustrative implementation) is configured to keep track of policy file versions and how each peer receives them as needed. In some cases, different clients get different versions of the policy file at the same time.

Thus, data has already been stored on ledger 216, which is part of a fully decentralized application. However, there is still one centralized certificate authority, i.e., CA 202. The centralized CA introduces a single point of failure to the entire system, even though the data is stored on ledger/blockchain in a decentralized way.

Besides decentralization, illustrative embodiments realize that users can benefit from additional features in an identity management system including, by way of example:

(i) The user should own his identity and have full control over it. The identity should not be stored on a centralized server, where the user only has limited control.

(ii) The identity should have a human readable name. Decentralized identity such as a media access control (MAC) address is not controlled by any central authority, however, the MAC address is not human readable and thus cannot be easily used in daily work.

(iii) The user could use a single identity to manage several resources (possibly controlled by different authorities).

From the view of resource managers or application developers, they could also build the access control feature based on the decentralized identities.

In light of these realizations, a number of challenges arise.

Single Point of Failure.

As the Internet becomes more and more decentralized, the user may have cryptocurrency stored on distributed ledgers and have valuable data stored on decentralized file systems, such as the Interplanetary File System (IPFS). However, the centralized identity server acts as the bottleneck, introducing a single point of failure to the otherwise fully decentralized solution.

Single Identity for Multiple Resources.

The resource owners typically run several different centralized servers of identities for their own purposes. If one user wants to have access to different resources, he/she should register multiple identities. This introduces a heavy burden to the user for managing different identities for different resources.

Ownership of Identity.

In the centralized solution, the identity registered by the user on the centralized server is not actually owned by the user. The data is stored on the server, so that the server owner actually has the power to modify and even delete the identity.

Flexibility Versus Security.

When it comes to a solution based on the blockchain, there is a tradeoff between flexibility and security. Due to the immutability of the blockchain, the entire identity record could be stored on the blockchain. This provides maximum security. However, updating the identity can not be easily achieved in a cost efficient way. On the other hand, if the identity is stored on some mutable storage, the integrity of the identity cannot easily be guaranteed.

Scalability.

If the entire set of identity records are stored on the blockchain, there is too much data directly stored on the chain. Since every node of the blockchain should maintain a full copy of the data on the chain, this introduces a scalability problem. The size of the chain could grow very fast, making it non-feasible in real world applications. Moreover, any update to the identity record will result in a new transaction as well as a new block (or a new record on the new block) on the chain, introducing significant computation burden on the entire network.

Availability.

The identity once created should have high availability. If the centralized server is used, the availability of the identity cannot be guaranteed, since the centralized server introduces a single point of failure.

Latency.

If all the identities are stored on the chain, high latency is experienced, since all users will contact the peers of the blockchain to retrieve the identities, and the bandwidth of peers becomes the bottleneck.

Illustrative embodiments overcome the above and other drawbacks associated with a centralized approach to identity management. In one or more illustrative embodiments, a combination of blockchain and IPFS are used to address the above-highlighted and other problems. While IPFS is described herein according to one or more illustrative embodiments, it is to be understood that alternative embodiments are not limited to IPFS.

IPFS is an open-source protocol that provides a decentralized method of storing and sharing files relying on a content-addressable, peer-to-peer hypermedia distribution. The compute nodes in an IPFS network form a distributed file system. A given one of the IPFS compute nodes resides on a client (or client otherwise has access to an IPFS compute node). The IPFS protocol was developed to replace the HyperText Transfer Protocol (HTTP) of the Internet which relies on location addressing (i.e., using Internet Protocol (IP) addresses to identify the specific computing resource that is hosting a desired data set). As such, with HTTP, the subject data set must be retrieved from the computing resource where it originated or some computing resource within the content delivery network (CDN) each time the data set is requested.

IPFS operates by operatively coupling devices/nodes with the same system of files. More particularly, IPFS uses a distributed hash table (DHT) with a block exchange (BitSwap) and namespace methodology that operates across disparate devices and unreliable networks. IPFS operates similarly to a torrent system, except that rather than exchanging media, IPFS exchanges objects based on a key-value data store. Any type of content can be inserted into the data sharing system, and the system returns a key (i.e., in the form of a hash value) that can be used to retrieve the content from a node that has it stored thereon at any time. Accordingly, IPFS is a content addressing protocol instead of a location addressing protocol. That is, the hash value is independent of the origin of the data set and can be hosted anywhere in the system.

In one example, the IPFS system is further described in J. Benet, "IPFS—Content Addressed, Versioned, P2P File System," 2014, the disclosure of which is incorporated by reference herein in its entirety. However, illustrative embodiments are not limited to this particular data storage network and alternative systems may be employed.

Furthermore, as used herein, the terms "blockchain," "chain," "ledger" and "blockchain ledger" may be used interchangeably. As is known, the blockchain or distributed ledger protocol is implemented via a distributed, decentralized computer network of compute nodes. A given one of the blockchain compute nodes resides on a client (or client otherwise has access to a blockchain compute node). The compute nodes are operatively coupled in a peer-to-peer communications protocol. In the computer network, each compute node is configured to maintain a blockchain which is a cryptographically secured record or ledger of data blocks that represent respective transactions within a given computational environment. The blockchain is secured through use of a cryptographic hash function. A cryptographic hash function is a cryptographic function which takes an input (or "message") and returns a fixed-size alphanumeric string, which is called the hash value (also a message digest, a digital fingerprint, a digest, or a checksum). Each blockchain is thus a growing list of data records hardened against tampering and revision, and typically includes a timestamp, current transaction data, and information linking it to a previous block. More particularly, each subsequent block in the blockchain is a data block that includes a given transaction(s) and a hash value of the previous block in the chain, i.e., the previous transaction. That is, each block is typically a group of transactions. Thus, advantageously, each data block in the blockchain represents a given set of transaction data plus a set of all previous transaction data. In digital ledger technologies such as blockchain, an underlying consensus algorithm is typically used to validate new transactions before they are added to the distributed ledger. Typically, for example, the new transaction is broadcast to all nodes within the network, inspected, a consensus is reached, and the entry is formally committed to the blockchain based on whether consensus is reached that the entry is validated.

In the case of a "bitcoin" type implementation of a blockchain distributed ledger, the blockchain contains a record of all previous transactions that have occurred in the bitcoin network. The bitcoin system was first described in S. Nakamoto, "Bitcoin: A Peer to Peer Electronic Cash System," 2008, the disclosure of which is incorporated by reference herein in its entirety.

A key principle of the blockchain is that it is trusted. That is, it is critical to know that data in the blockchain has not been tampered with by any of the compute nodes in the computer network (or any other node or party). For this reason, a cryptographic hash function is used. While such a hash function is relatively easy to compute for a large data set, each resulting hash value is unique such that if one item of data in the blockchain is altered, the hash value changes. However, it is realized that given the constant generation of new transactions and the need for large scale computation of hash values to add the new transactions to the blockchain, the blockchain protocol rewards compute nodes that provide the computational service of calculating a new hash value. In the case of a bitcoin network, a predetermined number of bitcoins are awarded for a predetermined amount of computation. The compute nodes thus compete for bitcoins by performing computations to generate a hash value that satisfies the blockchain protocol. Such compute nodes are referred to as "miners." Performance of the computation of a hash value that satisfies the blockchain protocol is called "proof of work." While bitcoins are one type of reward, blockchain protocols can award other measures of value (monetary or otherwise) to successful miners.

It is to be appreciated that the above description represents an illustrative implementation of the blockchain protocol and that embodiments are not limited to the above or any particular blockchain protocol implementation. As such, other appropriate processes may be used to securely maintain and add to a set of data in accordance with embodiments of the invention. For example, distributed ledgers such as, but not limited to, R3 Corda, Ethereum, and Hyperledger may be employed in alternative embodiments.

Figure 3:
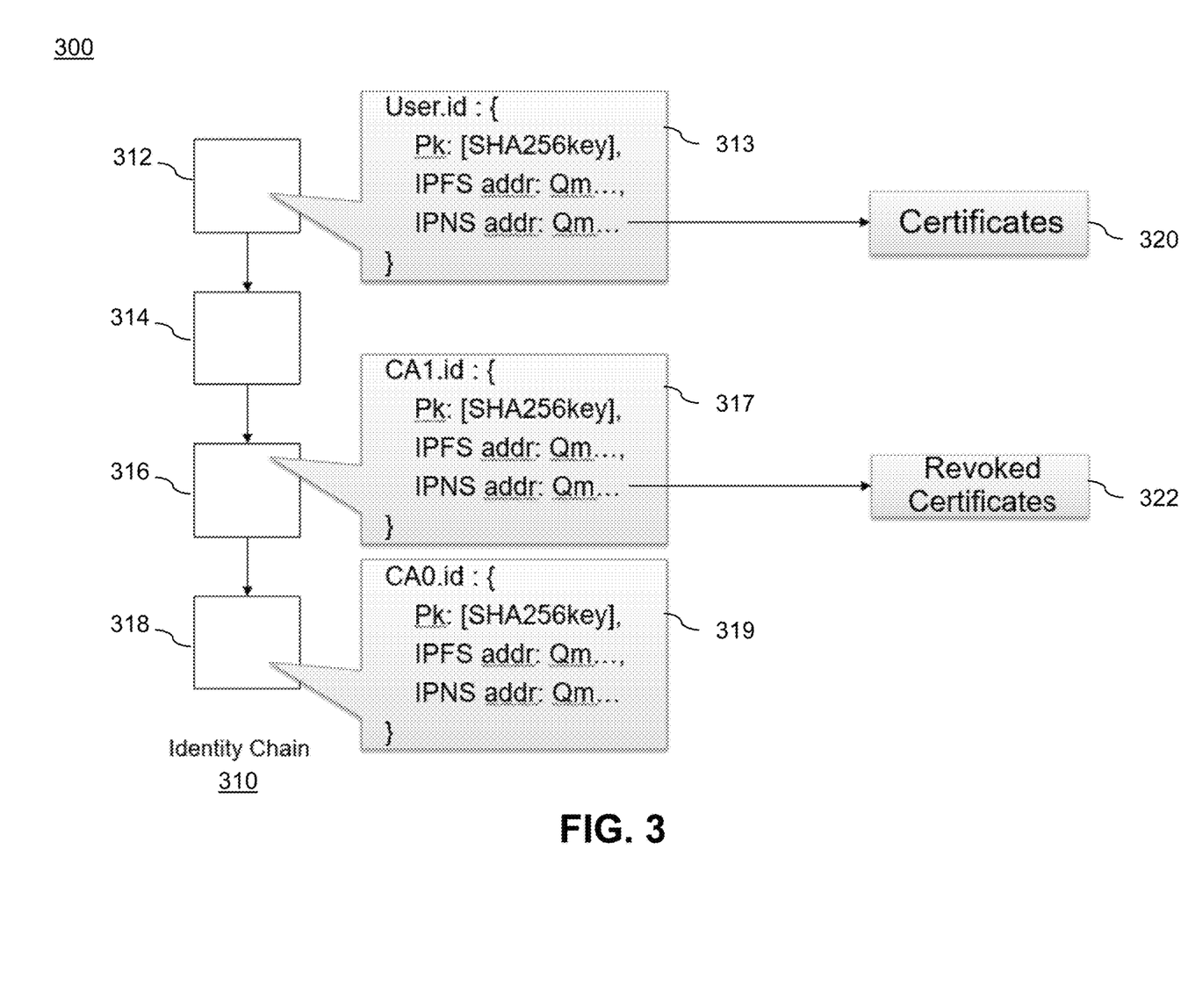
FIG. 3 illustrates a decentralized identity management process according to an illustrative embodiment.

FIG. 3 illustrates an example 300 of decentralized identity management according to an illustrative embodiment. As shown, an identity chain (blockchain) 310 is used to store identity records 312 through 318. Since the blockchain is decentralized, the identities thus are stored in a decentralized manner. In addition, in this illustrative embodiment, all parts of the identity are not stored on the blockchain 310. Rather, in one or more illustrative embodiments, only the addresses (or pointers) are stored on the blockchain 310, and the actual data is stored off (remote from) the blockchain on a decentralized file system (such as IPFS).

A definition of the decentralized identity is illustrated in FIG. 3. Details for records 312, 316 and 318 are shown as 313, 317 and 319, respectively. As shown, each record is key-value based. The key of the record is a human readable name, for example, user.id and CA1.id, instead of 01:23:45: 67:89:ab. The value of the record is a triple.

The first entry of the triple is the public key (Pk) corresponding to the private key held by the owner of the identity. The user can use the private key to prove that he actually controls the identity, while anyone can use the public key stored in the identity to verify that claim.

The second entry is the IPFS address, pointing to some immutable data. Note that the identity stored on the blockchain and the data stored on the IPFS are both immutable. From the IPFS address in the identity record, the immutable data held by the user is retrieved. Due to the immutability, rarely changed data is preferably stored in this IPFS address.

The third entry of the triple is an Interplanetary Name Space (IPNS) address. IPNS is a namespace on top of IPFS, see, e.g., the above-referenced J. Benet, "IPFS—Content Addressed, Versioned, P2P File System," 2014. IPNS provides mutability to store and retrieve data. IPNS can be treated as a folder, where only the one holding the private key can store data in this folder, while no one else can store data into this folder but they can read data from the folder. The frequently changed data can be stored in the location (remote from the identity blockchain) that is pointed to by the IPNS address. In a decentralized authentication case, certificates 320 of the user to prove the user has certain permission can be stored via the IPNS address. Likewise, revoked certificates 322 held by system administrators can be stored via the IPNS address. This illustrative record structure is shown in further detail in FIG. 4.

Figure 4:
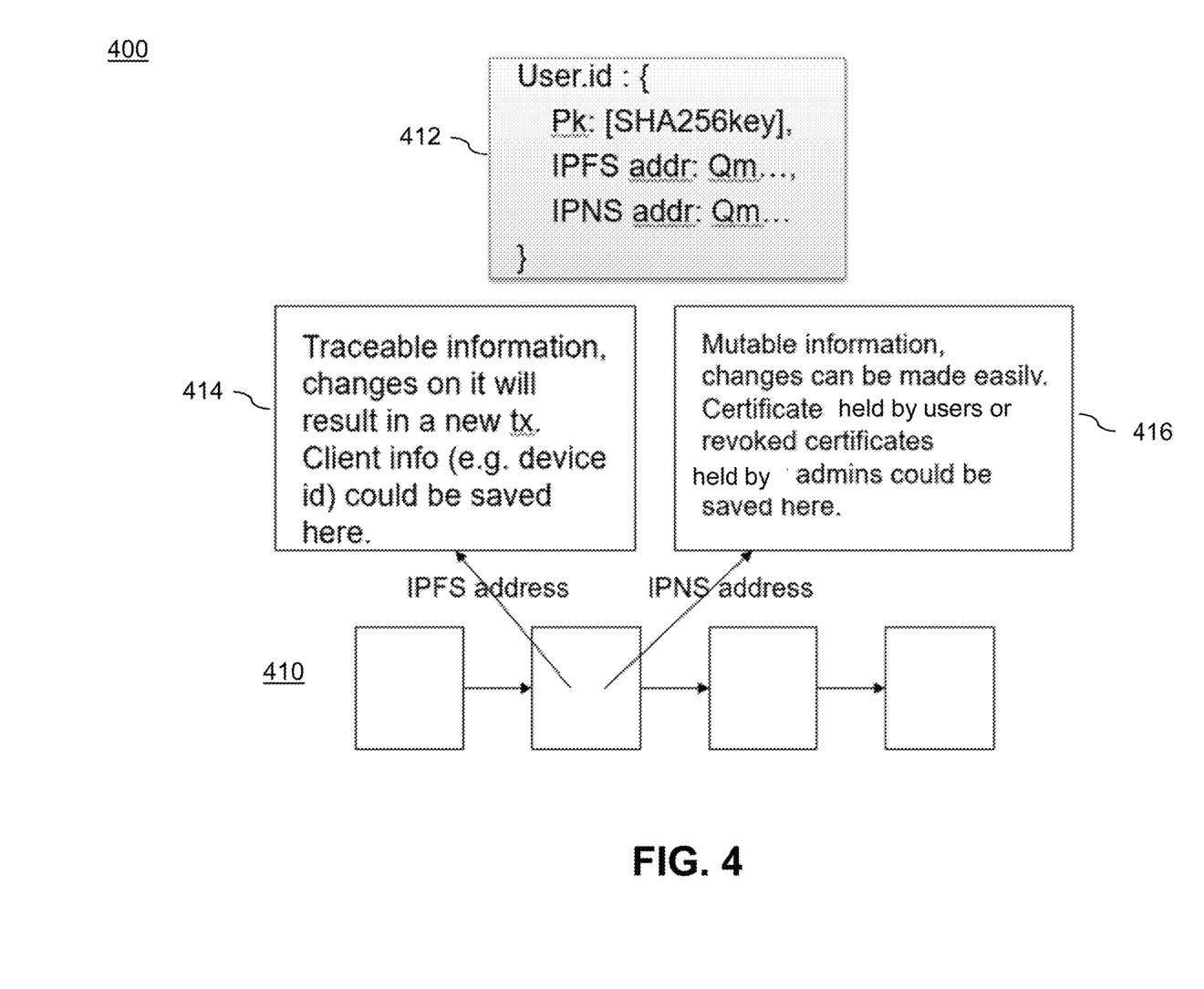
FIG. 4 illustrates use of file system and name space addresses in a decentralized identity management process according to an illustrative embodiment.

More particularly, FIG. 4 illustrates use of file system and name space addresses in decentralized identity management according to an illustrative embodiment. In example 400, blockchain 410 includes a record 412 which includes an IPFS address that stores (i.e., points to the storage of) traceable information 414 whereby changes to the information result in a new transaction (tx) on the blockchain. Client information (e.g., client device ID) can be stored in this entry of the record. Record 412 also includes an IPNS address that stores (i.e., point to storage of) mutable information 416 whereby changes can more easily be made as explained above. Certificates and revoked certificates can be stored in this entry of the record.

Figure 5:
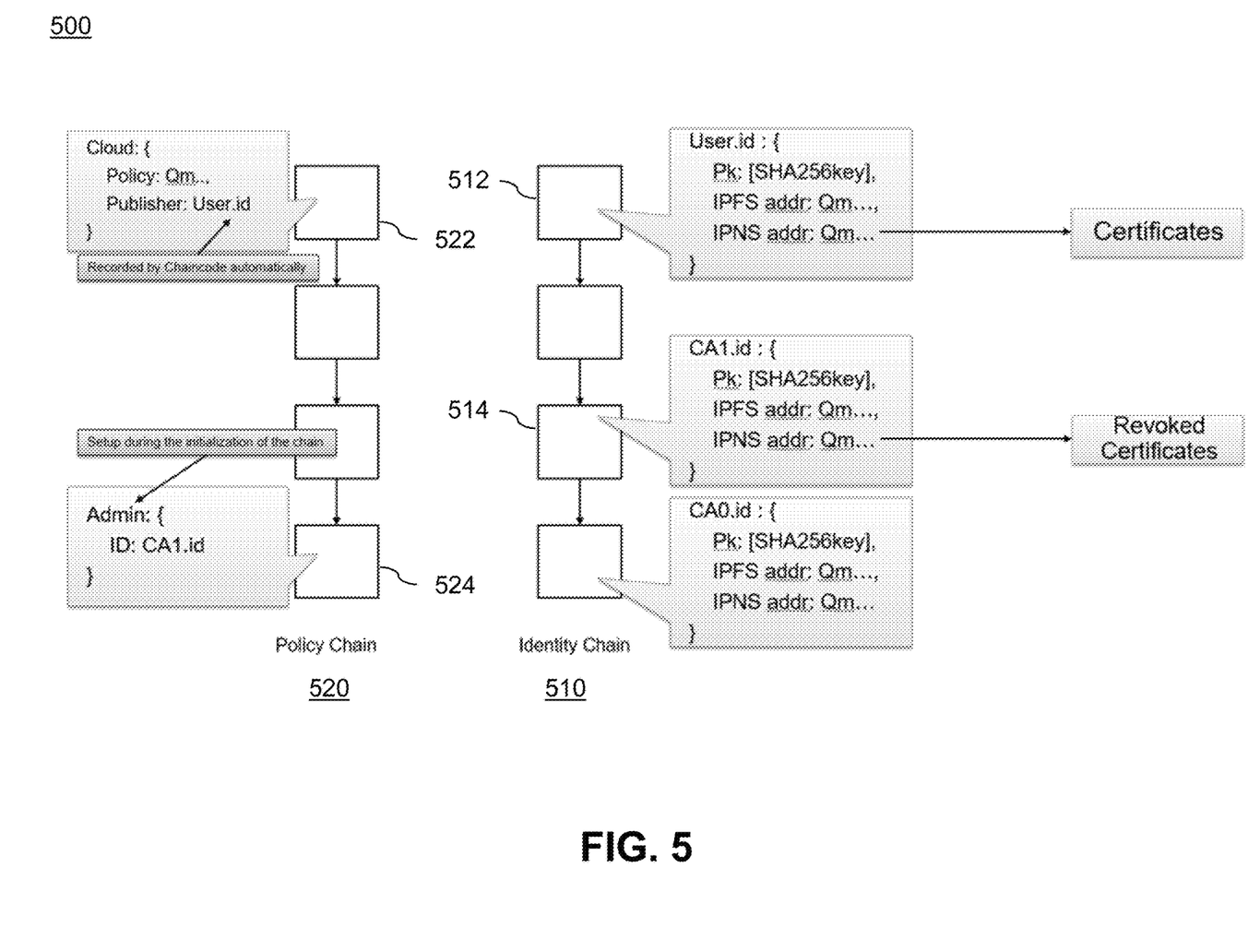
FIG. 5 illustrates interaction between an identity chain and a decentralized application in a decentralized identity management process according to an illustrative embodiment.

With identities managed in a decentralized manner according to illustrative embodiments, an improved solution to the authentication problem illustrated in FIG. 2 is achieved. FIG. 5 illustrates an example 500 of interaction between an identity chain 510 and a decentralized application chain (policy chain) 520 according to an illustrative embodiment. Note again that the term chain as used herein is short for blockchain.

Both the user and the administrator of the application register themselves by creating an identity record on the identity chain 510. The identity records are created as described above in the context of FIGS. 3 and 4. In this example 500 in FIG. 5, assume record 512 is the user identity record and record 514 is the administrator identity record. While in the policy (application) chain 520, the authentication procedure is implemented by only referring to the human readable ID names on the identity chain, i.e., record 522 refers to the user ID and record 524 refers to the adminstrator ID.

For example, in a decentralized policy publication and query system (e.g., as described in the above-referenced U.S. Ser. No. 16/048,785), the policy chain used to publish a policy file also stores the ID name of the administrator of the policy chain 520. Anyone can publish and query a policy file on the policy chain 520 by providing his or her ID name. The policy chain 520 automatically checks both the user identity and the administrator identity from the identity chain 510 to decide whether the user has certain permission.

Note that in this way, the requirement of using centralized authentication or an identity server is eliminated, so that the service (e.g., policy publication and query) can be provided in a fully decentralized way.

Figure 6:
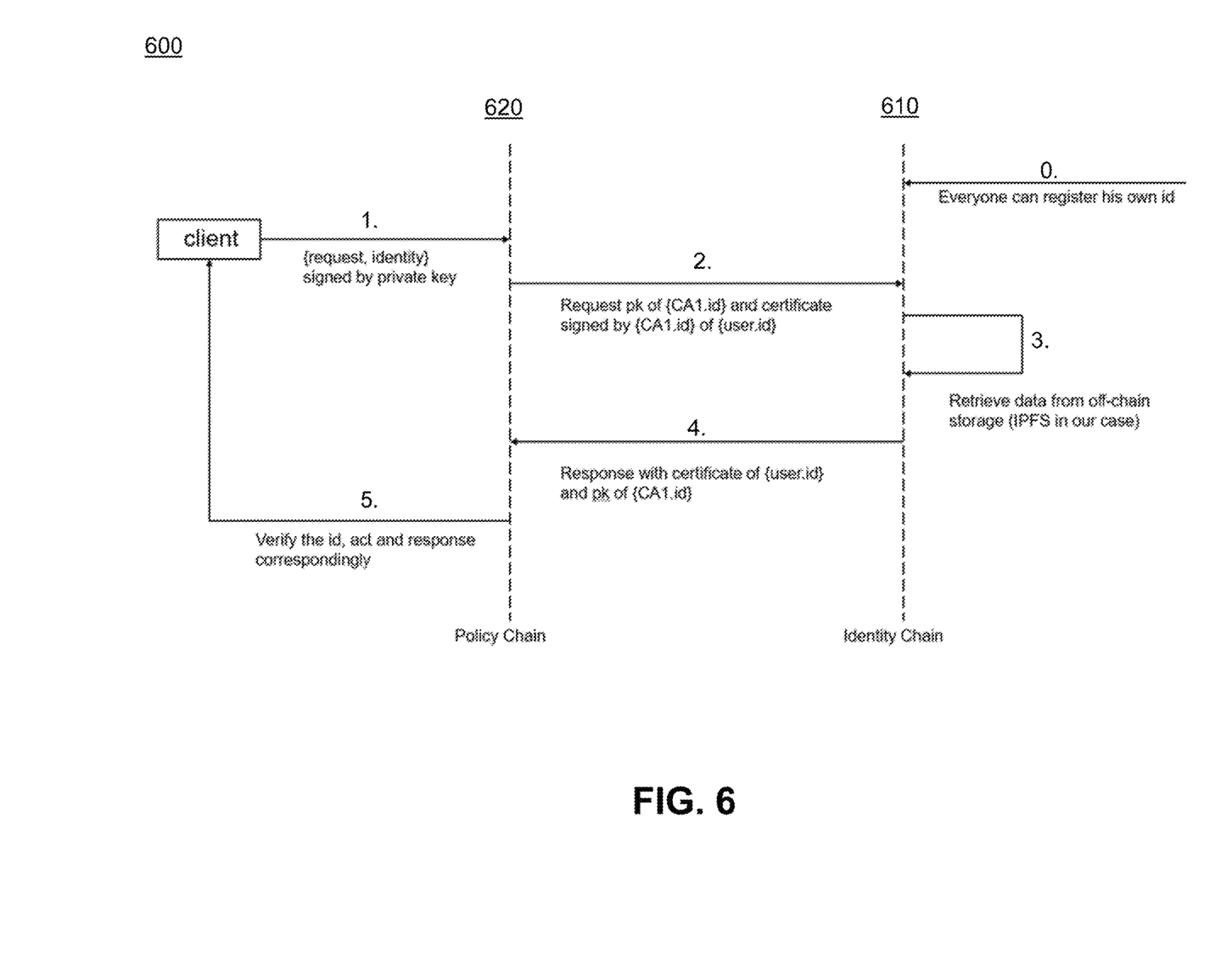
FIG. 6 illustrates interaction between an identity chain and an application chain in a decentralized identity management process according to an illustrative embodiment.

FIG. 6 illustrates an overall process 600 of the interaction between an identity chain 610 and an application (policy) chain 620. Steps 0 through 5 in process 600 will be explained in detail below in the context of FIGS. 7 and 8.

In general, in FIG. 6, the user and the administrator register themselves on the identity chain 610 in step 0. The user then submits an access request to the policy chain 620 in step 1. In step 2, the policy chain 620 contacts the identity chain 610 to authenticate the user. The identity chain 610 retrieves authentication data (e.g., certificate) using the user identity in step 3, and responds to the policy chain 620 in step 4. The policy chain 620, in step 5, then responds to the user giving the user access consistent with the permission(s) in the certificate or otherwise denying access.

Figure 7:
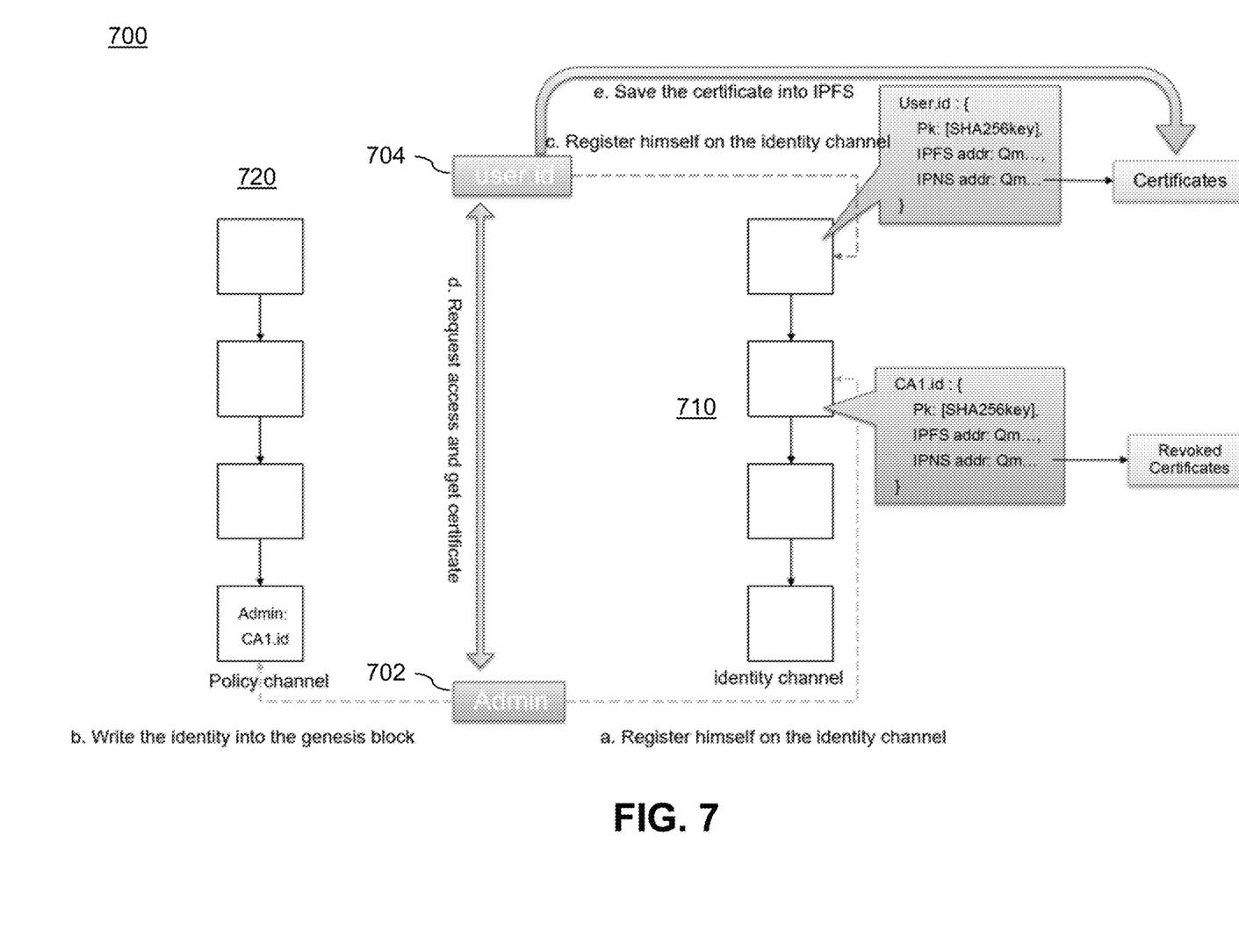
FIG. 7 illustrates an identity registration and permission request procedure in a decentralized identity management process according to an illustrative embodiment.

The registration process 700 is illustrated in FIG. 7 in the context of an administrator (admin) 702, a user 704, an identity chain (channel) 710 and a policy chain (channel) 720, and steps a through e. Note that the sequential order of letters a through e in FIG. 7 do not necessarily reflect the order in which the corresponding steps are explained in the description below. Note that the terms chain and channel are interchangeable in this illustrative description.

More particularly, as shown in FIG. 7, user 704 prepares the user name (e.g. 'user.id'), the public and private key pair, and the IPNS/IPFS addresses to register himself (step c).

The data to be written in the identity chain 710 thus includes {user.id, public key, IPFS/IPNS addresses}, and the user digitally signs the data with the private key:

Signature=PriKey(Hash({user.id, public key, IPFS/IPNS addresses}))

The peers of identity chain 710 receive the registration request:
(i) Check whether or not the user.id has been used.
(ii) Verify that the user does have the private key:
PubKey(Signature) Hash({user.id, public key, IPFS/IPNS address})
(iii) If the request passes the verification, accept it and commit the transaction.

The user 704 requests certain permission from the administrator 702 which is also illustrated in process 700 of FIG. 7 (step d).

It is assumed that there is an admin ID of the policy chain 720, which defines who has read/write access to the policy chain 720. The admin ID ('CA1.id' in this example) is registered on the identity chain 720 (step a), and written into the genesis block of the policy chain 720 (step b) since the policy chain is set up by the administrator.

The administrator controls his/her own private key. The revoked list contains a set of users whose access to the policy chain 720 has been revoked by the administrator.

A user with id 'user.id' can freely register himself/herself on the identity chain 710, however, this id has no access to the policy chain 720. The user can request access from the administrator, and the administrator may issue a certificate to the user accordingly. In one or more illustrative embodiments, the certificate has {expire date, user.id, permissions granted (read or write or both), issuer (id name and public key)} and is signed by the private key of the administrator (where the corresponding public key is stored in the identity record of the administrator on the identity chain 710).

It is to be appreciated that the process is done off-chain, however, it is also possible to operate on chain, at the cost of significantly more transactions.

Once the user receives the certificate, the user saves it in his/her own [IPNS address] recorded on the identity chain 710 (step e).

The administrator can revoke the certificates issued, and stores the revoked certificates in his/her own [IPNS address].

Figure 8:
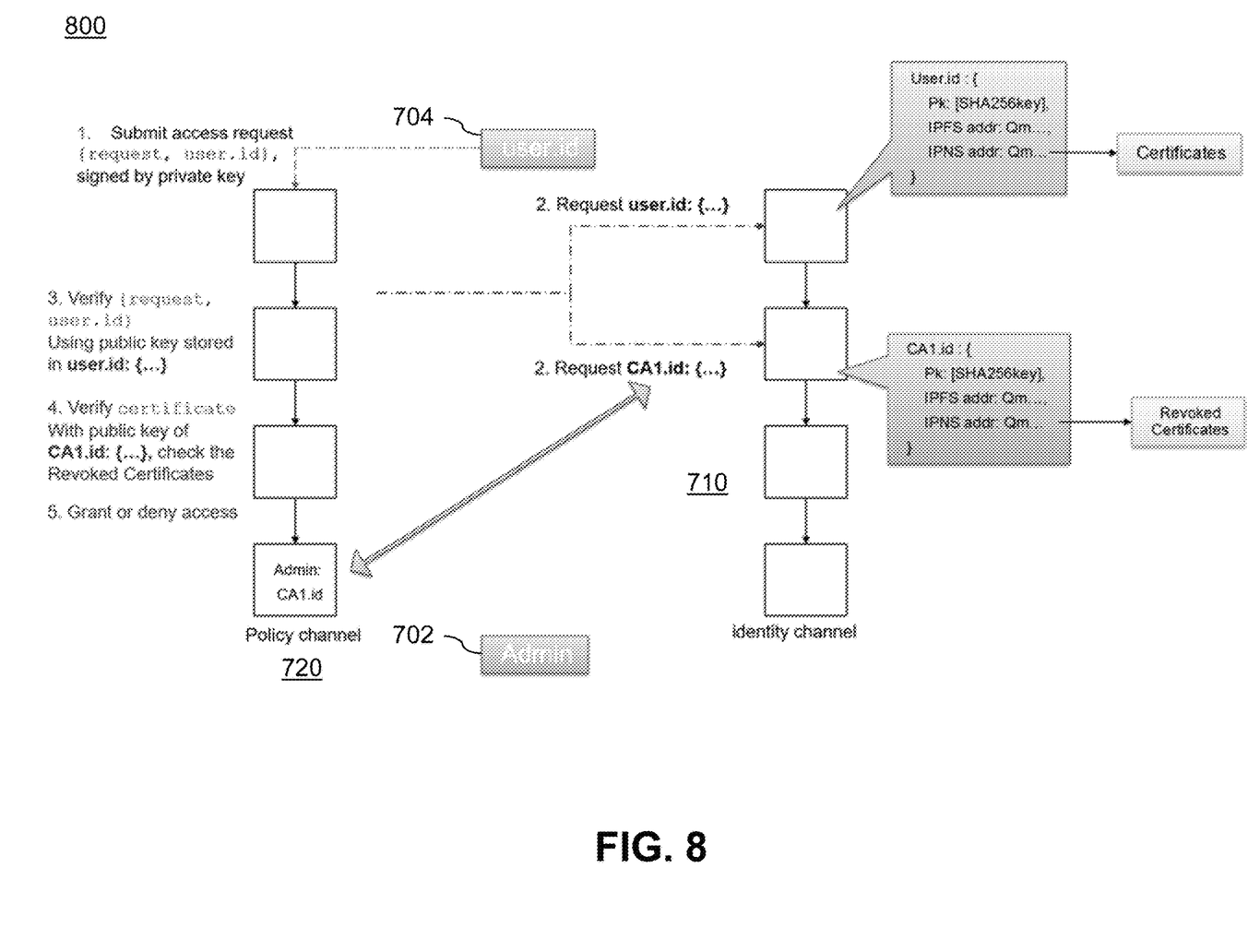
FIG. 8 illustrates an identity and permission verification procedure in a decentralized identity management process according to an illustrative embodiment.

Next, the user publishes a new policy file to the policy chain 720. The process 800 is illustrated in FIG. 8 in the context of steps 1 through 5. Note that policy publication is only one example of a decentralized application with which decentralized identity management embodiments can be implemented.

The user prepares a new request, which contains the new policy file and his own id ('user.id'). The request (with nonce) is signed by the user's private key. The user submits the request to the policy chain 720 (step 1).

Peers on the policy chain 720 who receive the request:
(i) Retrieve the public key and revoked list of 'CA1.id' from the identity chain 710 (part of step 2). The information is retrievable since the admin id 'CA1.id' is saved on the policy chain 720. This procedure can be optimized. For example, once the public key is retrieved, it can be saved, and all peers can auto-synchronize with the revoked list.
(ii) Retrieve the public key and corresponding certificate of the user, based on the 'user.id' in the request (part of step 2).
(iii) Verify the request using the user's public key, making sure that the request is actually submitted by 'user.id' (step 3).
(iv) Verify the certificate of the user using the public key of 'CA1.id', making sure that the certificate is not faked (step 4).
(v) Check the certificate for corresponding permissions to operate (step 5).

If all verifications are satisfied, the peers commit the transaction and publish the new policy along with the 'user.id'. The policy and 'user.id' are signed by the user's private key, so that the entire network can repeat the verification process independently later.

Figure 9:
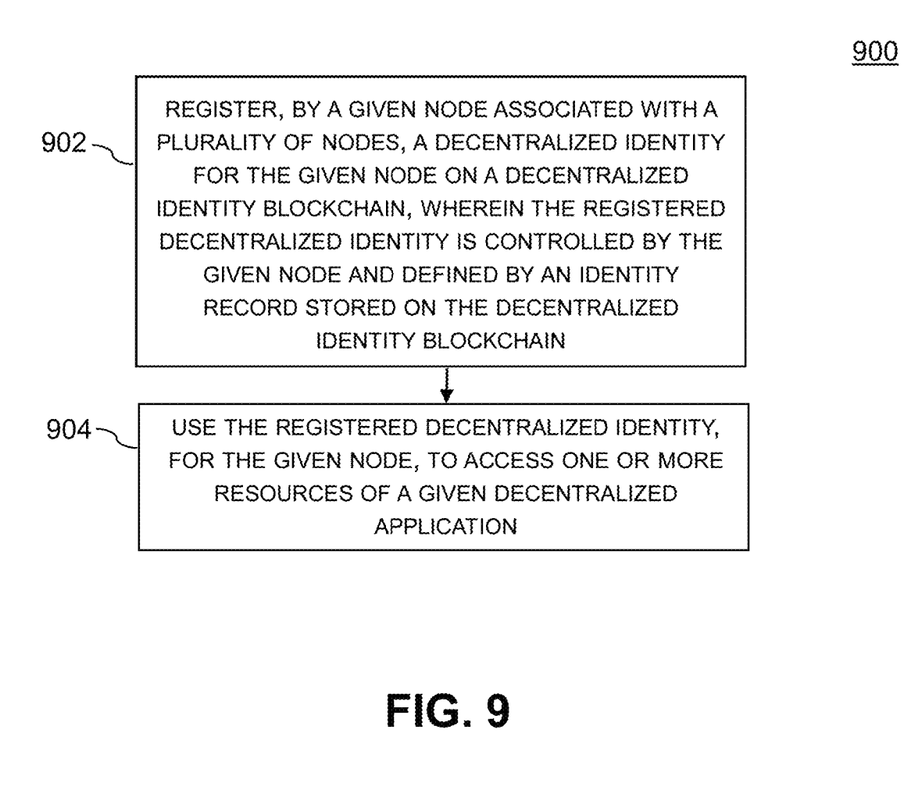
FIG. 9 illustrates a decentralized identity management methodology according to an illustrative embodiment.

Given the illustrative description of decentralized identity management techniques herein, FIG. 9 depicts a methodology 900 for decentralized identity management according to an illustrative embodiment.

In step 902 a given node associated with a plurality of nodes registers a decentralized identity for the given node on a decentralized identity blockchain. The registered decentralized identity is controlled by the given node and defined by an identity record stored on the decentralized identity blockchain.

In step 904, the registered decentralized identity for the given node is used to access one or more resources of a given decentralized application.

Decentralized identity management according to illustrative embodiments has many advantages, examples of which will now be described.

No Network Bottleneck.

With only the addresses of data stored on the blockchain and the actual data stored off chain, the network bandwidth limitation of blockchain peers will not be the bottleneck. Moreover, in illustrative embodiments that employ IPFS, which is peer-to-peer based, the bandwidth limitation of a single peer will not be the bottleneck.

Small Data on Chain with High Availability.

In the decentralized identity management system described herein, only data addresses are stored on the blockchain and, as such, the size of the blockchain will grow slowly. Furthermore, since both addresses to mutable contents and immutable contents are provided, the user could store constantly changing data in the IPNS address, limiting the number of new transactions and blocks. Moreover, data stored on the IPFS can be retrieved using the content-based address (CA) regardless of where and how many copies are stored, thus providing high availability of the data.

High Security and Flexibility.

Security and flexibility are both achieved by the decentralized identity management system described herein. Security is guaranteed by the immutability of both the blockchain and IPFS. Flexibility is provided by the IPNS namespace, since mutable data is stored in accordance with the identity record, and the integrity/security of the data stored in IPNS is guaranteed by the public key infrastructure (PKI) based procedure.

One Identity for Multiple Applications.

In the decentralized identity management system described herein, only the user holding the private key corresponding to the public key stored in the record owns the record. The user can store as many certificates as he wants in the IPNS address for different applications. So once a user owns the identity, he can use it for multiple applications.

It is to be appreciated that the particular advantages described above and elsewhere herein are associated with particular illustrative embodiments and need not be present in other embodiments. Also, the particular types of information processing system features and functionality as illustrated in the drawings and described above are exemplary only, and numerous other arrangements may be used in other embodiments.

Illustrative embodiments of processing platforms utilized to implement host devices and storage systems with decentralized identity management functionality will now be described in greater detail with reference to FIGS. 10 and 11.

Figure 10:
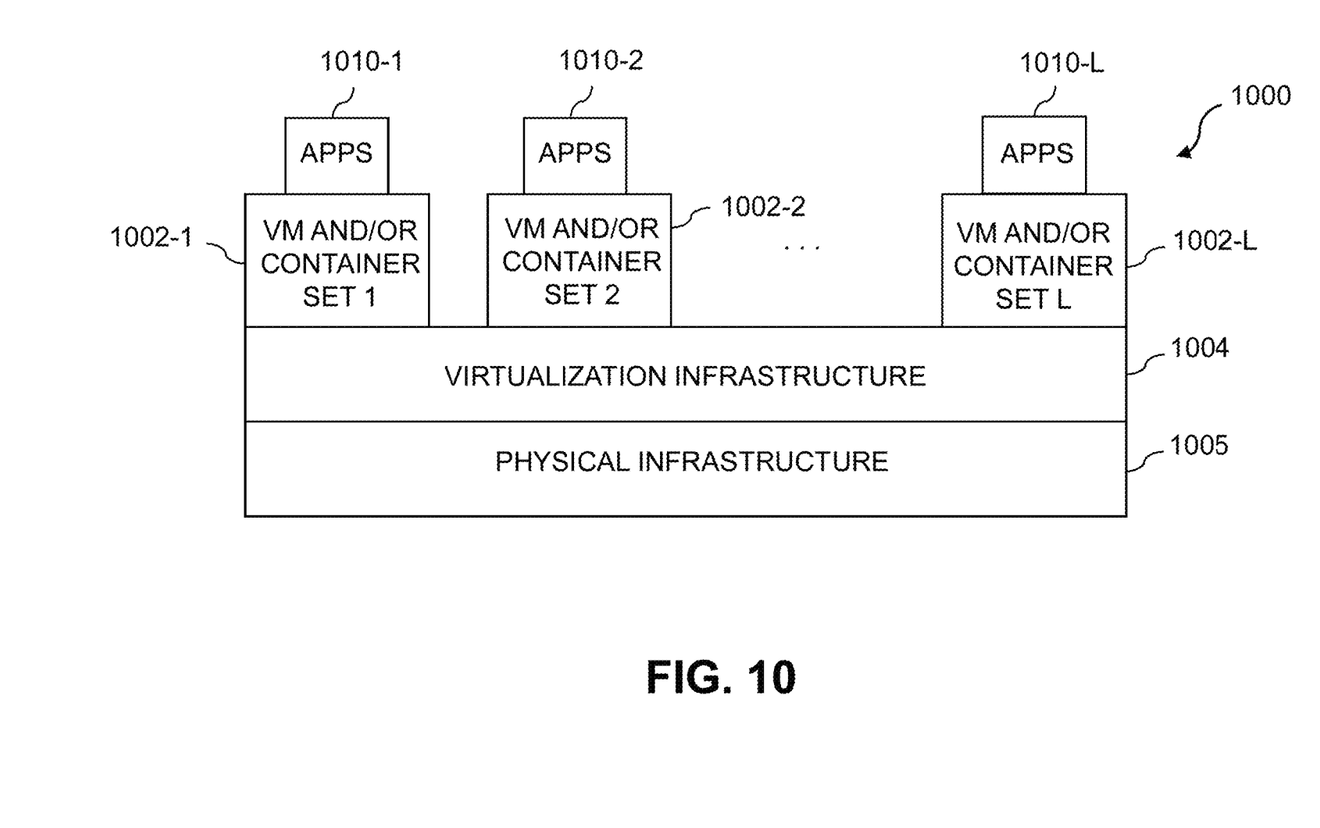
FIGS. 10 and 11 illustrate examples of processing platforms utilized to implement at least a portion of a decentralized identity management system according to illustrative embodiments.
Figure 11:
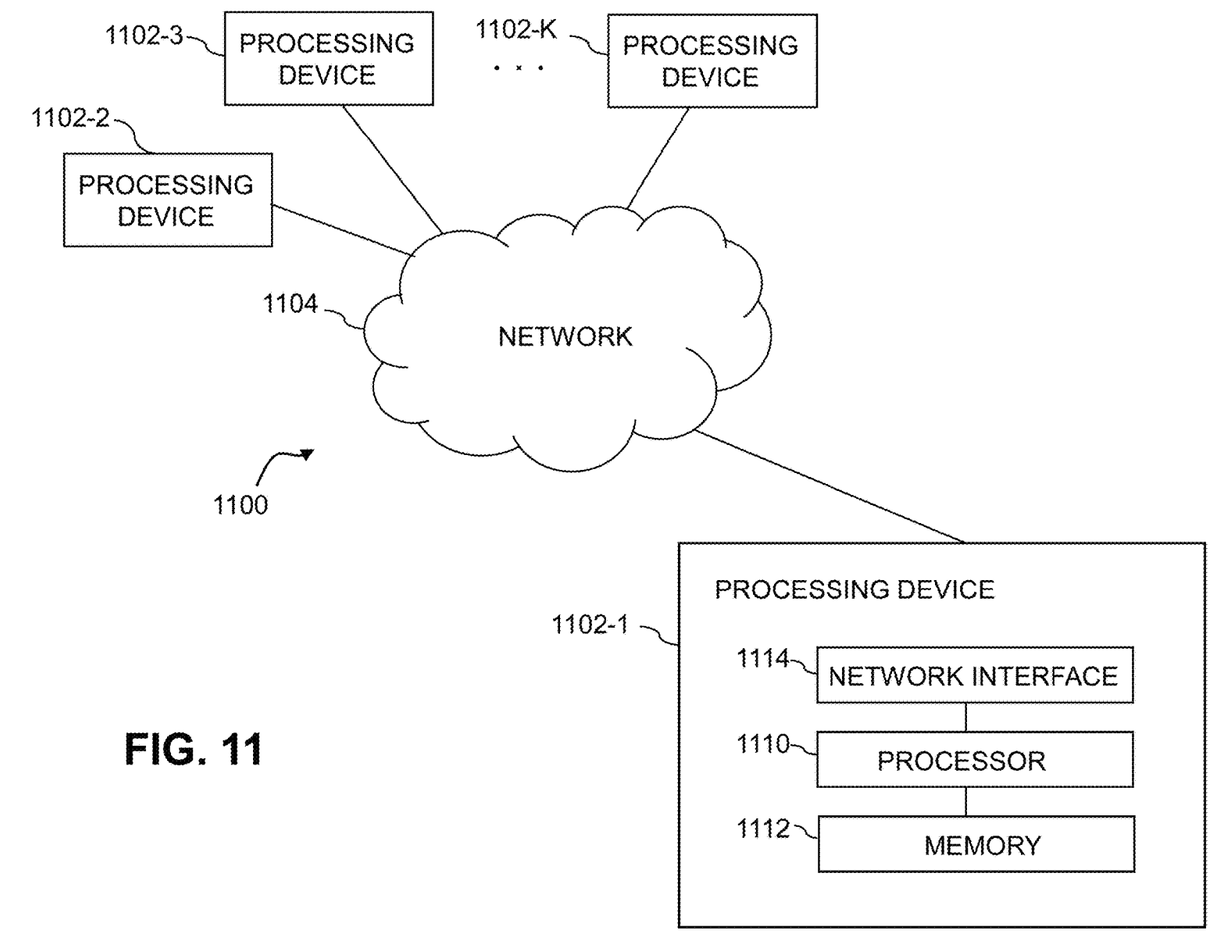

FIG. 10 shows an example processing platform comprising cloud infrastructure 1000. The cloud infrastructure 1000 comprises a combination of physical and virtual processing resources that may be utilized to implement at least a portion of the decentralized identity management system described herein. The cloud infrastructure 1000 comprises multiple virtual machines (VMs) and/or container sets 1002-1, 1002-2, . . . 1002-L implemented using virtualization infrastructure 1004. The virtualization infrastructure 1004 runs on physical infrastructure 1005, and illustratively comprises one or more hypervisors and/or operating system level virtualization infrastructure. The operating system level virtualization infrastructure illustratively comprises kernel control groups of a Linux operating system or other type of operating system.

The cloud infrastructure 1000 further comprises sets of applications 1010-1, 1010-2, . . . 1010-L running on respective ones of the VMs/container sets 1002-1, 1002-2, . . . 1002-L under the control of the virtualization infrastructure 1004. The VMs/container sets 1002 may comprise respective VMs, respective sets of one or more containers, or respective sets of one or more containers running in VMs.

In some implementations of the FIG. 10 embodiment, the VMs/container sets 1002 comprise respective VMs implemented using virtualization infrastructure 1004 that comprises at least one hypervisor. Such implementations can provide functionality of the type described above for one or more processes running on a given one of the VMs. For example, each of the VMs can implement functionality for one or more processes running on that particular VM.

An example of a hypervisor platform that may be used to implement a hypervisor within the virtualization infrastructure 1004 is the VMware® vSphere® which may have an associated virtual infrastructure management system such as the VMware® vCenter™. The underlying physical machines may comprise one or more distributed processing platforms that include one or more storage systems.

In other implementations of the FIG. 10 embodiment, the VMs/container sets 1002 comprise respective containers implemented using virtualization infrastructure 1004 that provides operating system level virtualization functionality, such as support for Docker containers running on bare metal hosts, or Docker containers running on VMs. The containers are illustratively implemented using respective kernel control groups of the operating system. Such implementations can provide decentralized identity management functionality of the type described above for one or more processes running on different ones of the containers. For example, a container host device supporting multiple containers of one or more container sets can implement one or more instances of decentralized identity management logic for use in implementing the functionalities described herein.

As is apparent from the above, one or more of the processing modules or other components of system 100 may each run on a computer, server, storage device or other processing platform element. A given such element may be viewed as an example of what is more generally referred to herein as a "processing device." The cloud infrastructure 1000 shown in FIG. 10 may represent at least a portion of one processing platform. Another example of such a processing platform is processing platform 1100 shown in FIG. 11.

The processing platform 1100 in this embodiment comprises a portion of system 100 and includes a plurality of processing devices, denoted 1102-1, 1102-2, 1102-3, . . . 1102-K, which communicate with one another over a network 1104.

The network 1104 may comprise any type of network, including by way of example a global computer network such as the Internet, a WAN, a LAN, a satellite network, a telephone or cable network, a cellular network, a wireless network such as a WiFi or WiMAX network, or various portions or combinations of these and other types of networks.

The processing device 1102-1 in the processing platform 1100 comprises a processor 1110 coupled to a memory 1112.

The processor 1110 may comprise a microprocessor, a microcontroller, an application-specific integrated circuit (ASIC), a field-programmable gate array (FPGA) or other type of processing circuitry, as well as portions or combinations of such circuitry elements.

The memory 1112 may comprise random access memory (RAM), read-only memory (ROM), flash memory or other types of memory, in any combination. The memory 1112 and other memories disclosed herein should be viewed as illustrative examples of what are more generally referred to as "processor-readable storage media" storing executable program code of one or more software programs.

Articles of manufacture comprising such processor-readable storage media are considered illustrative embodiments. A given such article of manufacture may comprise, for example, a storage array, a storage disk or an integrated circuit containing RAM, ROM, flash memory or other electronic memory, or any of a wide variety of other types of computer program products. The term "article of manufacture" as used herein should be understood to exclude transitory, propagating signals. Numerous other types of computer program products comprising processor-readable storage media can be used.

Also included in the processing device 1102-1 is network interface circuitry 1114, which is used to interface the processing device with the network 1104 and other system components, and may comprise conventional transceivers.

The other processing devices 1102 of the processing platform 1100 are assumed to be configured in a manner similar to that shown for processing device 1102-1 in the figure.

Again, the particular processing platform 1100 shown in the figure is presented by way of example only, and system 100 may include additional or alternative processing platforms, as well as numerous distinct processing platforms in any combination, with each such platform comprising one or more computers, servers, storage devices or other processing devices.

For example, other processing platforms used to implement illustrative embodiments can comprise converged infrastructure such as VxRail™, VxRack™, VxRack™ FLEX, VxBlock™ or Vblock® converged infrastructure from VCE, the Virtual Computing Environment Company, now the Converged Platform and Solutions Division of Dell EMC.

It should therefore be understood that in other embodiments different arrangements of additional or alternative elements may be used. At least a subset of these elements may be collectively implemented on a common processing platform, or each such element may be implemented on a separate processing platform.

As indicated previously, components of an information processing system as disclosed herein can be implemented at least in part in the form of one or more software programs stored in memory and executed by a processor of a processing device. For example, at least portions of the decentralized identity management functionality of one or more components of a host device or storage system as disclosed herein are illustratively implemented in the form of software running on one or more processing devices.

It should again be emphasized that the above-described embodiments are presented for purposes of illustration only. Many variations and other alternative embodiments may be used. For example, the disclosed techniques are applicable to a wide variety of other types of information processing systems, host devices, storage systems, storage nodes, storage devices, storage controllers, decentralized identity management processes and associated control logic. Also, the particular configurations of system and device elements and associated processing operations illustratively shown in the drawings can be varied in other embodiments. Moreover, the various assumptions made above in the course of describing the illustrative embodiments should also be viewed as exemplary rather than as requirements or limitations of the disclosure. Numerous other alternative embodiments within the scope of the appended claims will be readily apparent to those skilled in the art.

What is claimed is:

1. A method comprising:
registering, by a given node associated with a plurality of nodes, a decentralized identity for the given node on a decentralized identity blockchain, wherein the registered decentralized identity is controlled by the given node and defined by an identity record stored on the decentralized identity blockchain; and
using the registered decentralized identity, for the given node, to access one or more resources of a given decentralized application;
wherein the identity record comprises a public key corresponding to a private key held by the given node, the public key stored in the identity record being usable by at least a subset of the plurality of nodes to verify that the given node controls the identity;
wherein the private key is usable by the given node to prove that the given node controls the identity;
wherein the identity record further comprises one or more of:
a decentralized file system address pointing to immutable data stored remote from the decentralized identity blockchain; and
a decentralized name space address pointing to mutable data stored remote from the decentralized identity blockchain; and
wherein the given node is implemented via at least one processing device comprising a processor coupled to a memory.

2. The method of claim 1, wherein the identity record comprises a human readable name of the given node.

3. The method of claim 1, wherein the immutable data comprises data associated with the given node that infrequently or never changes.

4. The method of claim 1, wherein the mutable data comprises certificate-related data associated with the given node.

5. The method of claim 1, wherein the identity record comprises information associated with the given node in a key-value pair format.

6. The method of claim 1, wherein the step of using the registered decentralized identity, for the given node, to access one or more resources of a given decentralized application further comprises:
sending a request from the given node to the given decentralized application to enable the given decentralized application to authenticate the given node by accessing the decentralized identity blockchain to obtain certificate-related data associated with the given node; and
receiving an indication of authentication at the given node from the given decentralized application wherein access to the one or more resources of the given decentralized application is based on the indication of authentication.

7. The method of claim 6, wherein the given decentralized application is maintained in accordance with a decentralized application blockchain in communication with the decentralized identity blockchain.

8. An article of manufacture comprising a non-transitory processor-readable storage medium having stored therein program code of one or more software programs, wherein the program code when executed by at least one processing device causes the processing device to perform steps of:
registering, by a given node associated with a plurality of nodes, a decentralized identity for the given node on a decentralized identity blockchain, wherein the registered decentralized identity is controlled by the given node and defined by an identity record stored on the decentralized identity blockchain; and
using the registered decentralized identity, for the given node, to access one or more resources of a given decentralized application;
wherein the identity record comprises a public key corresponding to a private key held by the given node, the public key stored in the identity record being usable by at least a subset of the plurality of nodes to verify that the given node controls the identity,
wherein the private key is usable by the given node to prove that the given node controls the identity; and
wherein the identity record further comprises one or more of:

a decentralized file system address pointing to immutable data stored remote from the decentralized identity blockchain; and a decentralized name space address pointing to mutable data stored remote from the decentralized identity blockchain.

9. The article of manufacture of claim 8, wherein the immutable data comprises data associated with the given node that infrequently or never changes.

10. The article of manufacture of claim 8, wherein the mutable data comprises certificate-related data associated with the given node.

11. The article of manufacture of claim 8, wherein the identity record comprises information associated with the given node in a key-value pair format.

12. The article of manufacture of claim 8, wherein the step of using the registered decentralized identity, for the given node, to access one or more resources of a given decentralized application further comprises:

sending a request from the given node to the given decentralized application to enable the given decentralized application to authenticate the given node by accessing the decentralized identity blockchain to obtain certificate-related data associated with the given node; and receiving an indication of authentication at the given node from the given decentralized application wherein access to the one or more resources of the given decentralized application is based on the indication of authentication.

13. The article of manufacture of claim 12, wherein the given decentralized application is maintained in accordance with a decentralized application blockchain in communication with the decentralized identity blockchain.

14. The article of manufacture of claim 8, wherein the identity record comprises a human readable name of the given node.

15. An apparatus comprising at least one processing device, wherein the at least one processing device comprises a processor coupled to a memory configured to:

register a decentralized identity, by a given node associated with a plurality of nodes, on a decentralized identity blockchain, wherein the registered decentralized identity is controlled by the given node and defined by an identity record stored on the decentralized identity blockchain; and use the registered decentralized identity, for the given node, to access one or more resources of a given decentralized application;

wherein the identity record comprises a public key corresponding to a private key held by the given node, the public key stored in the identity record being usable by at least a subset of the plurality of nodes to verify that the given node controls the identity;

wherein the private key is usable by the given node to prove that the given node controls the identity; and wherein the identity record further comprises one or more of:

a decentralized file system address pointing to immutable data stored remote from the decentralized identity blockchain; and a decentralized name space address pointing to mutable data stored remote from the decentralized identity blockchain.

16. The apparatus of claim 15, wherein the identity record comprises a human readable name of the given node.

17. The apparatus of claim 15, wherein the immutable data comprises data associated with the given node that infrequently or never changes.

18. The apparatus of claim 15, wherein the mutable data comprises certificate-related data associated with the given node.

19. The apparatus of claim 15, wherein the identity record comprises information associated with the given node in a key-value pair format.

20. The apparatus of claim 15, wherein using the registered decentralized identity, for the given node, to access one or more resources of a given decentralized application further comprises:

sending a request from the given node to the given decentralized application to enable the given decentralized application to authenticate the given node by accessing the decentralized identity blockchain to obtain certificate-related data associated with the given node; and receiving an indication of authentication at the given node from the given decentralized application wherein access to the one or more resources of the given decentralized application is based on the indication of authentication.

21. The apparatus of claim 20, wherein the given decentralized application is maintained in accordance with a decentralized application blockchain in communication with the decentralized identity blockchain.

* * * * *